United States Patent Office 3,646,138
Patented Feb. 29, 1972

3,646,138
β-AMIDOSULFOXIDES
Maximilian von Strandtmann, Rockaway, and Sylvester Klutchko, Hackettstown, N.J., assignors to Warner-Lambert Company, Morris Plains, N.J.
No Drawing. Continuation-in-part of application Ser. No. 843,800, July 22, 1969. This application Mar. 12, 1970, Ser. No. 19,106
Int. Cl. C07c 103/33
U.S. Cl. 260—558 S          8 Claims

ABSTRACT OF THE DISCLOSURE

The present invention is concerned with β-amidosulfoxides of Formulas I and II:

wherein X is oxygen or sulfur; Y is O or $O_2$; A is alkyl, cycloalkyl, substituted phenyl, naphthyl, biphenyl, heteroaryl or aralkyl; $R_1$ is hydrogen, lower alkyl, lower alkoxy, halo or nitro; $R_2$ is methyl, aryl, heteroaryl or arylmethylene.

The compounds of this invention possess sedative-hypnotic properties.

---

This application for U.S. Letters Patent is a continuation-in-part of our copending application U.S. Ser. No. 843,800, filed July 22, 1969, now abandoned.

The present invention is concerned with β-amidosulfoxides of Formulas I and II:

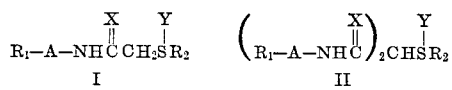

wherein X is oxygen or sulfur; Y is O or $O_2$; A is alkyl, cycloalkyl, substituted phenyl, naphthyl, biphenyl, heteroaryl, or aralkyl; $R_1$ is hydrogen, lower alkyl, lower alkoxy, halogen or nitro; and $R_2$ is methyl, aryl, heteroaryl or arylmethylene.

As used in this disclosure, the term "alkyl" includes lower aliphatic hydrocarbons having 1 to 12 carbon atoms in the carbon chain, it includes straight chain as well as branched chain radicals. The term includes, for example, methyl, ethyl, propyl, isopropyl, butyl, isobutyl and the like. The term "cycloalkyl" encompasses saturated monocyclic groups having from 3 to 8 carbon atoms such as cyclopropyl, cyclobutyl, cyclopentyl, cyclohexyl, cycloheptyl and cyclooctyl, and the like. The term "substituted phenyl" as used in this application comprehends phenyl groups in which one or more of the hydrogens have been substituted by groups such as hydroxy, halogen, trifluoromethyl, lower alkyl amino, substituted amino or lower alkoxy and the like. The term "heteroaryl" encompasses the monocyclic and bicyclic hetero rings having at least one hetero atom in the ring which may be either nitrogen, oxygen or sulfur. Representative hetero radicals falling within this description are, for example, pyridyl, thienyl, furyl, pyrryl and their benzo derivatives. The term "aralkyl" encomposses lower alkyl groups in which an aryl group as defined below is substituted for a hydrogen atom such as for example, benzyl, phenethyl, or the like, and also includes such groups in which one or more of the hydrogen atoms of the phenyl portion have been substituted by groups as indicated above. The term "aryl" and the aryl portion of "arylmethylene" as used throughout this disclosure denotes a monocyclic aromatic hydrocarbon radical preferably of 6 to 10 carbon atoms, such as for example, phenyl, tolyl and the like. The term "halogen" as used in this disclosure encompasses all four members of the halogen family, i.e. chlorine, bromine, iodine and fluorine. The term "lower alkyl" and the lower alkyl portion of "lower alkoxy" as used throughout this disclosure denotes hydrocarbons of 1 to 7 carbon atoms in the carbon chain.

The definitions for X, Y, A, $R_1$ and $R_2$ as used hereinafter have the same meaning as defined above.

The compounds of this invention are useful as sedatives. In experimental animals such as, mice, cats or dogs, they exhibit sedative, barbiturate-like properties at a dose level of 200–1000 mg./kg. orally. As sedatives, they are administered orally within the above-described dosage range and can be repeated one to three times daily depending upon the sedation required. In order to use these compounds, they are combined with an inert pharmaceutical carrier to form dosage forms such as tablets, capsules, pills, by methods well known to the pharmacist's art.

According to the process of this invention, compounds of Formula I and Formula II are prepared by allowing isocyanates of Formula III to react with a sulfoxide or a sulfone anion of general Formula IV:

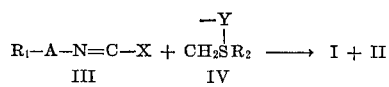

Products I and II obtained as a mixture are separated by crystallization. Isocyanates of Formula III are available from commercial sources such as Aldrich Chemical Co. Sulfoxide anion such as IV is prepared by treating a solution of a sulfoxide in an inert solvent with NaH. The sulfoxides are commercially available from Crown-Zellerbach Corporation, Camas, Washington, or they can be prepared by standard methods, such as, described in Org. Synth., vol. 46, pp. 78–80 (1966).

Sulfoxide and sulfone anions such as IV are prepared according to standard methods by treating a solution of a sulfoxide or sulfone in an invert solvent with NaH. Some of the sulfoxides and sulfones are commercially available; others can be prepared by standard methods.

The following examples are included in order further to illustrate the invention.

EXAMPLE 1

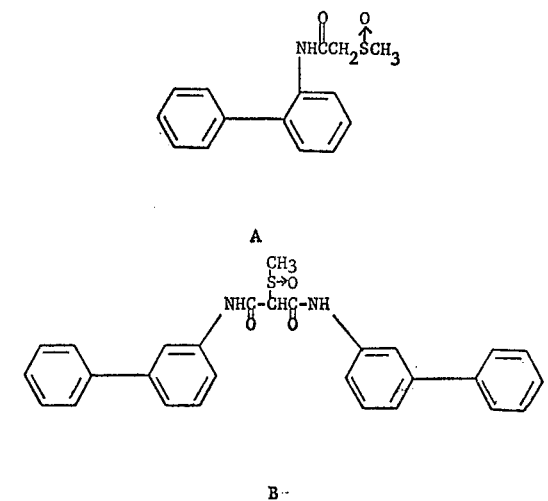

2-(methylsulfinyl)-2′-phenylacetanilide and N,N-bis(2-biphenylyl)-2-(methylsulfinyl)malonamide Preparation of the dimethylsulfoxide anion.—A mixture of 240 ml. of dimethylsulfoxide, 450 ml. of benzene and 16.5 g. (0.4 mole) of 58.6% sodium-hydride mineral oil dispersion is heated at 75–80° C. for one hour with stirring under nitrogen. The resulting solution is cooled to 5° C.

A solution of 29.3 g. (0.15 mole) of o-biphenylisocyanate in 250 ml. of benzene is added dropwise, with stirring, over a period of one-half hour to the above prepared anion, keeping the temperature at 5° C. with ice bath cooling. The deep yellow solution is allowed to warm to ca. 15° over a period of ca. one-half hour. Ether is added to a total volume of 2 liters to "knock out" a viscous material. After decantation, trituration with ether and decantation, ca. 1.5 liters of cold water and then 0.5 liters of ether are added and the mixture is stirred vigorously. The aqueous phase is separated and acidified with 35 ml. of glacial acetic acid. The separated solid is filtered and washed efficiently with ca. 100 ml. of water and dried to give 13.0 g. (37%) of B melting at 185–190° C. Two recrystallizations from ethyl acetate give pure B, M.P. 198–200° C.

*Analysis.*—Calcd. for $C_{28}H_{24}N_2O_3S$ (percent): C, 71.77; H, 5.16; N, 5.98; S, 6.84. Found (percent): C, 71.50; H, 5.19; N, 5.97; S, 7.00.

The above acidified filtrate is saturated with sodium chloride and extracted with two portions of 500 ml. of ethyl acetate. The combined extracts are dried over magnesium sulfate, charcoaled, filtered, and concentrated. The crystalline residue, obtained by trituration with 100 ml. of ether, is filtered and washed with ether. This material is Compound A. It weighs 7.0 g. (17%) and melts at 94–96° C. Recrystallization from ethyl acetate gives pure A melting at 97–99° C.

*Analysis.*—Calcd. for $C_{15}H_{15}NO_2S$ (percent): C, 65.91; H, 5.53; N, 5.12; S, 11.73. Found (percent): C, 66.04; H, 5.57; N, 4.96; S, 11.88.

EXAMPLE 2

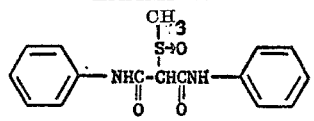

2-(methylsulfinyl)-N,N-diphenylmalonamide

This compound is prepared by the same general procedure outlined in the biphenyl experiment. The product is isolated in 21% yield. Recrystallization from ethyl acetate gives pure material, M.P. 170–172° C.

*Analysis.*—Calcd. for $C_{16}H_{16}N_2O_3S$ (percent): C, 60.74; H, 5.10; N, 8.85; S, 10.13. Found (percent): C, 60.88; H, 5.09; N, 9.02; S, 10.31.

EXAMPLE 3

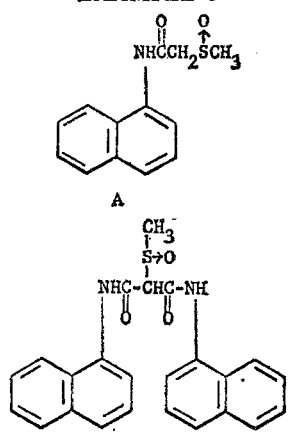

2-(methylsulfinyl)-N-(1-naphthyl)acetamide and 2-(methylsulfinyl)-N,N-di-1-naphthylmalonamide Compounds A and B are prepared by the same general procedure outlined in the biphenyl experiment.

Compound A is isolated in 19% yield. The pure compound is obtained by recrystallization from ethyl acetate and melts at 119–121° C.

*Analysis.*—Calcd. for $C_{13}H_{13}NO_2S$ (percent): C, 63.14; H, 5.30; N, 5.66; S, 12.96. Found (percent): C, 63.32; H, 5.32; N, 5.85; S. 12.90.

Compound B is isolated in 42% yield. The pure compound obtained by recrystallization from ethyl acetate melts at 197–200° C. dec.

*Analysis.*—Calcd. for $C_{24}H_{20}N_2O_3S$ (percent): C, 69.21; H, 4.84; N, 6.73; S, 7.70. Found (percent): C, 69.45; H, 4.85; N, 6.56; S, 7.89.

EXAMPLE 4

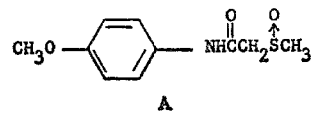

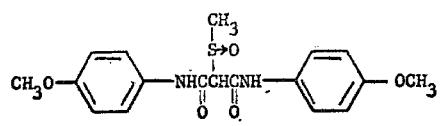

2-(methylsulfinyl)-p-acetanisidide and N,N-bis(p-methoxyphenyl)-2-(methylsulfinyl)malonamide Compounds A and B are prepared by the same general procedure outlined in the biphenyl experiment.

Compound A is isolated in 7% yield. The pure compound is obtained by recrystallization from ethyl acetate and melts at 140–142° C.

*Analysis.*—Calcd. for $C_{10}H_{13}NO_3S$ (percent): C, 52.85; H, 5.77; N, 6.16; S, 14.11. Found (percent): C, 52.74; H, 5.73; N, 6.39; S, 14.21.

Compound B is isolated in 13% yield. The pure compound is obtained by recrystallization from methanol and melts at 168–170° C.

*Analysis.*—Calcd. for $C_{18}H_{20}N_2O_5S$ (percent): C, 57.43; H, 5.36; N, 7.33; S, 8.52. Found (percent): C, 57.62; H, 5.34; N, 7.17; S, 8.75.

EXAMPLE 5

N-cyclohexyl-2-(methylsulfinyl)thioacetamide

A mixture of dimethylsulfoxide (100 ml.), benzene (300 ml.) and 57% sodium hydride mineral oil dispersion (14 g., 0.33 mole) is heated at 75–80° C. with stirring under nitrogen until all the solid has dissolved to give a green solution (1 to 2 hours).

Cyclohexyl isothiocyanate (21.3 g., 0.15 mole) is added over five minutes to the ice cold solution of the dimethylsulfoxide anion with vigorous stirring. The reaction mixture is stirred at 40° for two hours and poured into a large excess of ether. The white insoluble sodium salts are filtered, washed with ether, and decomposed by the addition of ice. The resulting aqueous solution is extracted with ethyl acetate. The ethyl acetate extracts are dried over sodium sulfate and evaporated to give a brown gum. The gum is triturated several times with petroleum ether and crystallized from ethyl acetatepetroleum ether. Recrystallization from ethyl acetate gives white crystals (6.53 g., 21%) melting point 92–93°. Further recrystallization gives pure N-cyclohexyl-2-(methylsulfinyl)thioacetamide (5.59 g.), M.P. 94–95° C.

*Analysis.*—Calcd. for $C_9H_{17}NS_2O$ (percent): C, 49.28; H, 7.81; N, 6.39; S, 29.23. Found (percent): C, 49.21; H, 7.86; N, 6.46; S, 29.04.

EXAMPLE 6

2-(methylsulfinyl)thioacetanilide

Prepared by the general procedure described in Example 5. The product is is isolated in 12.5% yield. Recrystallization gives the pure material, yellow crystals, M.P. 113–114°.

*Analysis.*—Calcd. for $C_9H_{11}NOS_2$ (percent): C, 50.67; H, 5.20; N, 6.57; S, 30.06. Found (percent): C, 50.62; H, 5.23; N, 6.57; S, 30.11.

EXAMPLE 7

2-methylsulfinyl)-N-(2-naphthyl)thioacetamide

Prepared by the general procedure described in Example 6. The product is isolated in 28% yield. Recrystallization from ethyl acetate gives the pure compound, yellow crystals, M.P. 104–105°.

*Analysis.*—Calcd. for $C_{13}H_{13}NOS_2$ (percent): C, 59.28; H, 4.98; N, 5.32; S, 24.35. Found (percent): C, 59.52; H, 5.09; N, 5.54; S, 24.28.

EXAMPLE 8

N-(1-adamantyl)-2-(methylsulfinyl)thioacetamide

Prepared by the general procedure described in Example 7. The product is isolated in 59% yield. Recrystallization gives the pure compound white crystals, M.P. 165–166°.

*Analysis.*—Calcd. for $C_{13}H_{21}NOS_2$ (percent): C, 57.52; H, 7.80; N, 5.16; S, 23.62. Found (percent): C, 57.58; H, 7.78; N, 5.46; S, 23.59.

EXAMPLE 9

N-cyclohexyl-2-(methylsulfonyl)thioacetamide

Prepared by the general procedure described in Example 8. The product is isolated in 8% yield. Recrystallization from methanol gives white crystals, M.P. 140–141.5°.

*Analysis.*—Calcd. for $C_9H_{17}NO_2S_2$ (percent): C, 45.93; H, 7.28; N, 5.95; S, 27.25. Found (percent): C, 46.11; H, 7.40; N, 5.99; S, 27.22.

EXAMPLE 10

2-(methylsulfonyl)-N,N'-diphenylmalonamide

A mixture of dimethylsulfoxide (40 ml.), 1,2-dimethoxyethane (200 ml.) 57% sodium hydride mineral oil dispersion (16.5 g., 0.4 mole) and dimethylsulfone (37.6 g., 0.4 mole) is heated at 80° to 90° with stirring under nitrogen for 3 hours.

Phenyl isocyanate (24 g., 0.1 mole) in 1,2-dimethoxyethane (30 ml.) is added in 2 minutes at 5°. The reaction mixture is stirred at 30° to 40° for 2 hours, cooled and poured onto ice. The precipitate is filtered, washed with water and dried to give synthetic diphenyl urea 4.5 g. (21%). Recrystallization from methanol gives an analytical sample, M.P. 240–242° C.

The aqueous filtrate is acidified with acetic acid. The white precipitate which forms is filtered and washed with water and dried to give 2-(methylsulfonyl)-N,N'-diphenylmalonamide 16.2 g. (49%). Recrystallization from ethanol gives an analytical sample, M.P. 230–231°.

*Analysis.*—Calcd. for $C_{16}H_{16}N_2O_4S$ (percent): C, 57.82; H, 4.85; N, 8.43; S, 9.65. Found (percent): C, 57.89; H, 4.90; N, 8.21; S, 9.66.

EXAMPLE 11

N-(1-adamantyl)-2-(methylsulfonyl)thioacetamide

A mixture of dimethylsulfoxide (10 ml.), 1,2-dimethoxyethane (50 ml.), 57% sodium hydride mineral oil dispersion (4.2 g., 0.1 mole) and dimethylsulfone (9.4 g., 0.1 mole) is heated at 92–95° with stirring under nitrogen for 2 hours.

1-adamantyl isothiocyanate (10 g., 0.052 mole) in 1,2-dimethoxyethane (30 ml.) is added in 2 minutes to the ice cold solution of the dimethylsulfone anion with vigorous stirring. The reaction mixture is stirred at 35° for 90 minutes, cooled and poured onto ice. The white precipitate is filtered and washed with water.

Two recrystallizations from methanol give pure N-(1-adamantyl)-2-(methylsulfonyl)thioacetamide as white crystals, M.P. 175–176°; yield, 5.96 g. (41%).

*Analysis.*—Calcd. for $C_{13}H_{21}NO_2S_2$ (percent): C, 54.32; H, 7.36; N, 4.97; S, 22.31. Found (percent): C, 54.44; H, 7.40; N, 4.67; S, 22.41.

We claim:
1. 2-(methylsulfinyl)-2'-phenylacetanilide.
2. N,N' - bis(2 - biphenylyl)-2-(methylsulfinyl)malonamide.
3. 2-(methyl-sulfinyl)-N,N'-diphenylmalonamide.
4. 2-(methylsulfinyl)-N-(1-naphthyl)acetamide.
5. 2-(methyl-sulfinyl)-N,N'-di-1-naphthylmalonamide.
6. 2-(methyl-sulfinyl)-p-acetanisidide.
7. N,N' - bis(p-methoxyphenyl)-(2-methylsulfinyl)malonamide.
8. 2-(methylsulfonyl)-N,N'-diphenylmalonamide.

References Cited

UNITED STATES PATENTS

| 3,392,194 | 7/1968 | Waring | 260—559 |
| 3,161,680 | 1964 | McManus | 260—562 |
| 3,039,863 | 1962 | Fancher et al. | 260—558 |

OTHER REFERENCES

Nishio, Chemical Pharm. Bull., vol. 15, pp. 1669–76 (1967).

Dubenko et al., J. Org. Chem. of USSR, vol. 4, pp. 296–98 (February 1968).

Chemical Abstracts: Hellstrom article (vol. 30, col. 6707, 1936); Evans et al. (vol. 30, col. 3796, 1936); Fusco et al. (vol. 46, col. 5550–5551, 1952); Hunig et al. (vol. 48, col. 2567, 1953); Swiss Patent 312963—Steinmann (vol. 51, col. 5431, 1956); Viel et al. (vol. 67, No. 215688, 1967).

HENRY R. JILES, Primary Examiner

H. J. MOATZ, Assistant Examiner

U.S. Cl. X.R.

260—294.8 G, 326.3; 332.2 R, 332.2 A, 347.2, 551 S, 559 T, 561 S, 562 N, 562 S, 561 A; 424—263, 274, 275, 285, 324, 320